(12) United States Patent
Hannan et al.

(10) Patent No.: US 11,240,767 B2
(45) Date of Patent: Feb. 1, 2022

(54) METHOD AND SYSTEM FOR DETERMINING TRANSMISSION POWER OF RADIOS OF A TIME DIVISION DUPLEXING SYSTEM

(71) Applicant: CommScope Technologies LLC, Hickory, NC (US)

(72) Inventors: Ariful Hannan, Sterling, VA (US); Raina Rahman, Herndon, VA (US); Navin Srinivasan, Fairfax, VA (US)

(73) Assignee: CommScope Technologies LLC, Hickory, NC (US)

( * ) Notice: Subject to any disclaimer, the term of this patent is extended or adjusted under 35 U.S.C. 154(b) by 147 days.

(21) Appl. No.: 16/538,459

(22) Filed: Aug. 12, 2019

(65) Prior Publication Data

US 2020/0053669 A1 Feb. 13, 2020

Related U.S. Application Data

(60) Provisional application No. 62/736,325, filed on Sep. 25, 2018, provisional application No. 62/726,861, (Continued)

(51) Int. Cl.
*H04W 52/36* (2009.01)
*H04W 52/24* (2009.01)
(Continued)

(52) U.S. Cl.
CPC ......... *H04W 52/367* (2013.01); *H04L 5/1469* (2013.01); *H04W 16/14* (2013.01); (Continued)

(58) Field of Classification Search
CPC ........... H04W 72/0446; H04W 72/042; H04W 72/0406; H04L 5/00; H04L 5/0007; H04L 5/0048; H04L 5/0035; H04L 5/0053
See application file for complete search history.

(56) References Cited

U.S. PATENT DOCUMENTS

| | | | |
|---|---|---|---|
| 6,473,624 B1 * | 10/2002 | Corbett | H04W 52/40 455/442 |
| 2004/0192360 A1 * | 9/2004 | Tsai | H04W 16/10 455/501 |

(Continued)

FOREIGN PATENT DOCUMENTS

| KR | 1020160040624 A | 4/2016 |
|---|---|---|
| WO | 2016033049 A1 | 3/2016 |
| WO | 2018139714 A1 | 8/2018 |

OTHER PUBLICATIONS

International Searching Authority, "International Search Report and Written Opinion from PCT Application No. PCT/US2019/046190", from Foreign Counterpart to U.S. Appl. No. 16/538,459, dated Nov. 28, 2019, pp. 1-11, Published: WO.

(Continued)

*Primary Examiner* — Hoang-Chuong Q Vu
(74) *Attorney, Agent, or Firm* — Fogg & Powers LLC (57) ABSTRACT

Techniques for determining power levels of radios, including a time domain duplexing (TDD) system, in shared frequency spectrum is provided. A TDD radio, of the TDD system, in a neighborhood having a largest interference contribution in the frequency spectrum at the point. Transmit power levels are determined for (a) the selected TDD radio, (b) other radios in the neighborhood that are not part of the TDD system, and (c) at least one radio in the TDD system that is not the TDD radio having the largest interference contribution in the frequency spectrum. Thus, interference margin may be fairly allocated to radios in neighborhood(s) about protection points.

17 Claims, 6 Drawing Sheets

Related U.S. Application Data filed on Sep. 4, 2018, provisional application No. 62/718,264, filed on Aug. 13, 2018.

(51) Int. Cl.

| | | |
|---|---|---|
| *H04L 5/14* | (2006.01) | |
| *H04W 16/14* | (2009.01) | |
| *H04W 72/04* | (2009.01) | |
| *H04W 72/08* | (2009.01) | |
| *H04W 16/28* | (2009.01) | |

(52) U.S. Cl.
CPC ....... *H04W 52/242* (2013.01); *H04W 52/243* (2013.01); *H04W 72/0446* (2013.01); *H04W 16/28* (2013.01); *H04W 72/082* (2013.01)

(56) References Cited

U.S. PATENT DOCUMENTS

| | | | |
|---|---|---|---|
| 2008/0069039 A1 | 3/2008 | Li et al. | |
| 2013/0130707 A1* | 5/2013 | Tarokh | H04W 72/121 455/452.1 |
| 2015/0036509 A1 | 2/2015 | Lopes et al. | |
| 2015/0326463 A1* | 11/2015 | Solondz | H04L 43/12 370/252 |
| 2015/0373726 A1* | 12/2015 | Zhao | H04W 4/025 455/450 |
| 2017/0170888 A1 | 6/2017 | Yrjola et al. | |
| 2017/0188241 A1 | 6/2017 | Mueck et al. | |
| 2017/0188314 A1* | 6/2017 | Mueck | H04W 24/02 |
| 2017/0208454 A1 | 7/2017 | Knisely et al. | |
| 2017/0223638 A1 | 8/2017 | Lopes et al. | |
| 2017/0243139 A1 | 8/2017 | Dzierwa et al. | |
| 2017/0295497 A1 | 10/2017 | MacMullan et al. | |
| 2017/0295578 A1* | 10/2017 | Khoshnevisan | H04W 72/082 |
| 2017/0318470 A1 | 11/2017 | Srikanteswara et al. | |
| 2018/0014304 A1 | 1/2018 | Khoshnevisan et al. | |
| 2018/0132249 A1* | 5/2018 | Mueck | H04W 72/082 |
| 2018/0316416 A1 | 11/2018 | Reis et al. | |
| 2019/0081690 A1 | 3/2019 | Mueck et al. | |
| 2019/0120969 A1* | 4/2019 | Hamzeh | G01S 19/21 |
| 2019/0215698 A1 | 7/2019 | Balachandran et al. | |
| 2019/0335336 A1 | 10/2019 | Cimpu et al. | |
| 2019/0373615 A1 | 12/2019 | Cimpu et al. | |
| 2020/0052871 A1 | 2/2020 | Hannan et al. | |
| 2020/0162929 A1 | 5/2020 | Cimpu et al. | |

OTHER PUBLICATIONS

U.S. Patent and Trademark Office, "Notice of Allowance", U.S. Appl. No. 16/538,506, dated Jul. 22, 2020, pp. 1 through 20, Published: US.

U.S. Patent and Trademark Office, "Final Office Action", U.S. Appl. No. 16/507,965, dated Mar. 8, 2021, pp. 1 through 15, Published: US.

Drocella et al., "3.5 GHz Exclusion Zone Analyses and Methodology", NTIA Report 15-517, Mar. 2016, pp. 1-103, U.S. Department of Commerce.

Hufford, "The ITS Irregular Terrain Model, version 1.2.2 The Algorithm", National Telecommunications and Information Administration, Institute for Telecommunication Sciences, 2002, pp. 1-18, Boulder, CO.

International Searching Authority, "International Search Report and Written Opinion from PCT Application No. PCT/US2019/043253", from Foreign Counterpart to U.S. Appl. No. 16/507,965, dated Nov. 13, 2019, pp. 1-11, Published: WO.

3GPP, "3rd Generation Partnership Project; Technical Specification Group Radio Access Network; Evolved Universal Terrestrial Radio Access (e-UTRA); Physical channels and modulation (Release 15)", 3GPP TS 36.211, V15.7.0, Sep. 2019, pp. 1-239, 3rd Generation Partnership Project.

Hannan, Ariful et al., "Method and System for Determining Contribution to Aggregate Interference by a Time Division Duplexing System", U.S. Appl. No. 16/507,965, filed Jul. 10, 2019, pp. 1-27, Published: US.

WIF, "Requirements for Commercial Operation in the U.S. 3550-3700 MHz Citizens Broadband Radio Service Band", Version V1.4.1, Jan. 16, 2018, pp. 1-77, The Software Defined Radio Forum, Inc.

WIF, "Requirements for Commercial Operation in the U.S. 3550-3700 MHz Citizens Broadband Radio Service Band", Version V1.5.0, May 1, 2018, pp. 1-77, The Software Defined Radio Forum Inc.

WIF, "Requirements for Commercial Operation in the U.S. 3550-3700 MHz Citizens Broadband Radio Service Band", Version V1.7.0, May 6, 2019, pp. 1-80, The Software Defined Radio Forum Inc.

WIF, "Requirements for Commercial Operation in the U.S. 3550-3700 MHz Citizens Broadband Radio Service Band", Version V2.0.0, Feb. 3, 2017, pp. 1-73, The Software Defined Radio Forum Inc.

WIF, "Signaling Protocols and Procedures for Citizens Broadband Radio Service (CBRS): Spectrum Access System (SAS)—Citizens Broadband Radio Service Device (CBSD) Interface Technical Specification", Version V1.2.1, Jan. 3, 2018, pp. 1-60, The Software Defined Radio Forum Inc.

U.S. Patent and Trademark Office, "Office Action", U.S. Appl. No. 16/507,965, dated Dec. 14, 2020, pp. 1 through 27, Published: US.

U.S. Patent and Trademark Office, "Office Action", U.S. Appl. No. 16/507,965, dated Jun. 4, 2021, pp. 1 through 13, Published: US.

U.S. Patent and Trademark Office, "Final Office Action", U.S. Appl. No. 16/507,965, filed Oct. 12, 2021, pp. 1 through 18, Published: U.S.

\* cited by examiner

METHOD AND SYSTEM FOR DETERMINING TRANSMISSION POWER OF RADIOS OF A TIME DIVISION DUPLEXING SYSTEM

CROSS-REFERENCE TO RELATED APPLICATIONS

The present application claims benefit of U.S. Patent Application Ser. No. 62/718,264, filed Aug. 13, 2018; U.S. Patent Application Ser. No. 62/726,861, filed Sep. 4, 2018; and U.S. Patent Application Ser. No. 62/736,325, filed Sep. 25, 2018; the entire contents of each of the aforementioned patent applications are incorporated herein by reference as if set forth in its entirety.

BACKGROUND

Shared spectrum usage by governmental and commercial users has been proposed, e.g. for Citizens Broadband Radio Service (CBRS) specified by the United States Federal Communications Commission (FCC). With shared spectrum usage, a multitude of wireless service providers may utilize such spectrum. Each service provider would employ a system of citizens broadband radio service device(s) (CBSD(s)), such as base station(s), e.g. that would facilitate communications with user equipment (or end user devices (EUDs)). The system's CBSDs would be coupled to other networks, such as the Internet, e.g. by a core network.

The CBSDs are part of a shared access system ("SAS"). A SAS controller, of a SAS, regulates, e.g. the number and transmit power emissions of CBSDs that operate in the frequency spectrum in the neighborhood. A CBSD must request permission from the SAS controller prior to transmitting in a frequency spectrum controlled by the SAS controller. Optionally, the CBSD also requests that the SAS controller permit the requesting CBSD to transmit at a specified power level. The SAS controller then determines whether to allow the requesting CBSD to transmit in the frequency spectrum, and allocates using, e.g. an iterative allocation process (IAP), transmit power levels to all CBSDs authorized by the SAS controller to transmit in the frequency spectrum. WInnForum SAS general requirement (requirement) R2-SGN-16 of WINNF-TS-0112 defines the IAP. The IAP determines such transmit power levels by allocating interference margin fairly to CBSDs in neighborhood(s) of protection point(s) proximate to the CBSDs. The IAP determines such transmit power levels by allocating interference margin fairly CBSDs in neighborhoods of protection point(s) of one or more of each of a dynamic protection area, a fixed satellite service (FSS), a priority access license (PAL) protection area (PPA), a grandfathered wireless protection zone (GWPZ), and an environmental sensing capability (ESC) system. The foregoing systems are fixed in location and deemed to be receiving all the time at their fixed location.

CBSD systems typically comprise at least one access point communicatively coupled to one or more user equipment ("UE"). Typically, the user equipment are communications devices that emit relatively low power levels, e.g. smart phones, tablets, etc. Typically, the transmission power of the user equipment is limited, e.g. by law or standard, for example to 23 dBm/10 MHz. Because the transmission power of user equipment is relatively low and the location of the user equipment is below clutter level, emissions of each user equipment in a neighborhood can be ignored for purposes of interference analysis in frequency spectrum at a protection point; only the access point(s) are deemed CBSD(s) because their effective isotropic radiated power (EIRP) may be up to 47 dBm/10 MHz and their antenna height in most cases is above the clutter level.

However, some CBSD systems include user equipment that is consumer premises equipment (CPE) for fixed wireless systems. Such consumer premises equipment has a significantly higher transmission power level, e.g. 47 dBm/10 MHz, than typical user equipment. Emissions of such consumer premises equipment in a neighborhood may not be below the clutter level for purposes of interference analysis in frequency spectrum at a protection point. Therefore, laws, rules, and/or standards require that such CPE user equipment be deemed CBSDs or CPE-CBSDs. Transmission and transmit power levels of CPE-CBSDs must be authorized by the SAS controller of the SAS which includes such CPE-CBSDs.

Typically, in a communications system with CPE(s) and access point(s) ("CPE system"), the CPE(s) and corresponding access point(s) (or base stations) operate using time division duplexing ("TDD"). As a result, generally only one consumer premises equipment or one access point transmits in a channel at a given time period. Notwithstanding such operation, the WInnForum standard requires that any transmitter operating with an EIRP over 23 dBm/10 MHz must be registered as a CBSD and its contribution in interference calculation is aggregated. This example is not limited to Fixed Wireless Case and is true for any TDD system. A Distributed Antenna System (DAS) having multiple remote antenna units (RAUs) connected to a common baseband controller can share the RF resources among the RAUs and will not transmit on two or more RAUs using the same RF resource. However, this causes the SAS controller to inefficiently allocate transmit power to CBSDs of the SAS. Power levels are assigned to each CBSD in a SAS assuming that each TDD CBSD (access point(s) and CPE-CBSD(s)) of a TDD system or each RAU of the DAS system are transmitting simultaneously. As a result, lower power levels are allocated to CBSDs of the SAS than can practically be allocated. Therefore, there is a need for a more efficient technique to allocate power levels for SASs including TDD system(s).

SUMMARY OF THE INVENTION

A method for determining transmit power levels of a time division duplexing (TDD) system in a shared frequency spectrum is provided. The method comprises: determining an interference contribution in frequency spectrum at the point, where the interference contribution is determined for each TDD radio, of the TDD system, in a neighborhood around a point; selecting a TDD radio in the neighborhood having a largest interference contribution in the frequency spectrum at the point; determining transmit power levels for (a) the selected TDD radio and (b) other radios in the neighborhood that are not part of the TDD system; determining transmit power level for at least one TDD radio in the TDD system that is not the TDD radio having the largest interference contribution in the frequency spectrum; and sending the determined transmit power levels to corresponding radios which are configured to operate at the corresponding transmit power levels.

DETAILED DESCRIPTION

A technique for more accurately allocating transmission power levels, in a SAS, of TDD CBSDs in a TDD system is described. For each protection point, the technique determines the interference power level in frequency spectrum of each TDD CBSD of the TDD system based on the requested grant. The TDD CBSD of the TDD system creating the largest interference level (in comparison to other TDD CBSDs of the TDD system) in the frequency spectrum at each protection point of interest is referred to as a "largest interferer". Interference level may be described in terms of power level per frequency. Each protection point is analyzed independently. For regions including multiple protection points, a "largest interferer" will be identified independently for each protection point.

The technique then determines a maximum allowable transmit power level, e.g. a maximum allowable effective isotropic radiated power level, for the largest interferer. Then, using the maximum allowable transmit power level, the technique determines maximum allowable power levels for other TDD CBSDs of the TDD system. The other TDD CBSDs means the TDD CBSDs of the TDD system excluding the largest interferer. The maximum power levels of the other TDD CBSDs in the TDD system may be determined using the determined maximum allowable transmit power level of the largest interferer. This results in a lower aggregate transmission power level of all CBSDs in the TDD system. As a result, the SAS can permit increased transmission power in the frequency spectrum for all CBSDs in a neighborhood around the protection point. This allows CBSDs, e.g. access points, to transmit further distances to EUDs. In some cases, a CBSD requesting the opportunity to transmit in frequency spectrum may be allowed to do so, when conventional techniques would not have permitted transmission. Thus, more CBSDs may be allowed to operate in the frequency spectrum in the neighborhood A TDD system means a communications system comprised of TDD CBSDs, e.g. CPE(s) and access point(s), which operate using TDD in frequency spectrum (or a frequency channel). With TDD, only one TDD CBSD transmits during a given time period. A TDD CBSD means a CBSD, e.g. CPE(s) and access point(s), which operate using TDD in frequency spectrum.

Figure 1:
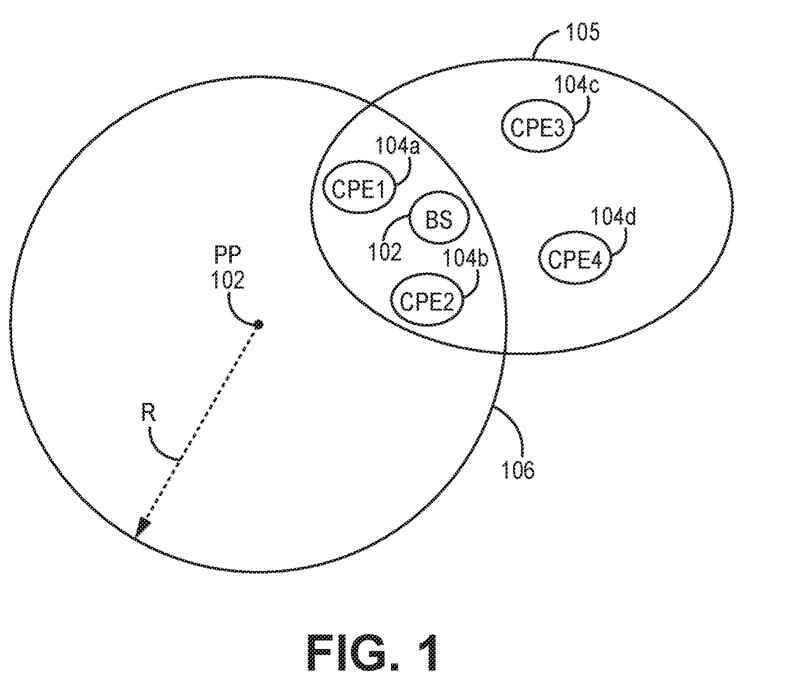
FIG. 1 illustrates an exemplary a diagram illustrating a protection point proximate to a time division duplexing system whose interference level is determined according to embodiments of the invention.

FIG. 1 illustrates an exemplary diagram illustrating a protection point proximate to a TDD system whose interference level is determined according to embodiments of the invention. A neighborhood 106 surrounds a protection point 102. In this example, the protection point 102 may be the location of a fixed satellite service (FSS). The neighborhood 106 is a circular area or region centered on the protection point 102 and having a radius R. WInnForum standard defines neighborhood for protection points in Table 1 of requirement R2-SGN-16. Alternatively, an area or region of another shape may be used.

Embodiments of the invention can be used with respect with a single protection point, or a protection area or zone (such as a GWPZ or PPA) having more than one protection point. A protection point area or zone (having more than one protection point), may hereinafter be referred to as a region or geographical region. For a region, an analysis of each protection point in the region is performed. Because the geographic location of the neighborhood may differ for each protection point, the TDD CBSDs of a TDD system in each neighborhood may also vary. Thus, the interference power level (or interference power spectral density) at different protection points contributed by the TDD system, as determined by embodiments of the invention, may also vary. It will be subsequently described how embodiments of the invention address a region having more than one protection point. 'Power level' may also be referred to herein as 'power'.

In the embodiment illustrated in FIG. 1, a TDD system 105 has three CBSDs (a base station (BS) 102, a first CPE (CPE1) 104a, and a second CPE (CPE2) 104b) located within the neighborhood 106. Alternatively, the TDD system 105 could have another number of CBSDs, e.g. one, two, four, etc., in the neighborhood. Other CBSDs of the TDD system 105, e.g. a third CPE (CPE3) 104c and a fourth CPE (CPE4) 104d, may be located outside of the neighborhood 106. The TDD system 105 is part of, and communicatively coupled to, a SAS. Other non-TDD CBSDs, that are part of the SAS, may also be in the neighborhood 106.

Using the example illustrated in FIG. 1 for pedagogical purposes, the SAS determines the neighborhood 106 for the protection point 102. Then, knowing the location of the CBSDs of the TDD system 105, the SAS determines which CBSDs are within the neighborhood, e.g. within the border (or within and on the border) of the neighborhood. Then, the SAS determines the interference level of each CBSD at the protection point. The SAS selects the highest interference power level at the protection point of any TDD CBSD (in the neighborhood 106) of the TDD system 105 for use as a contribution of the TDD system 105 to SAS's determination of aggregate interference at the protection point 102.

Figure 2:
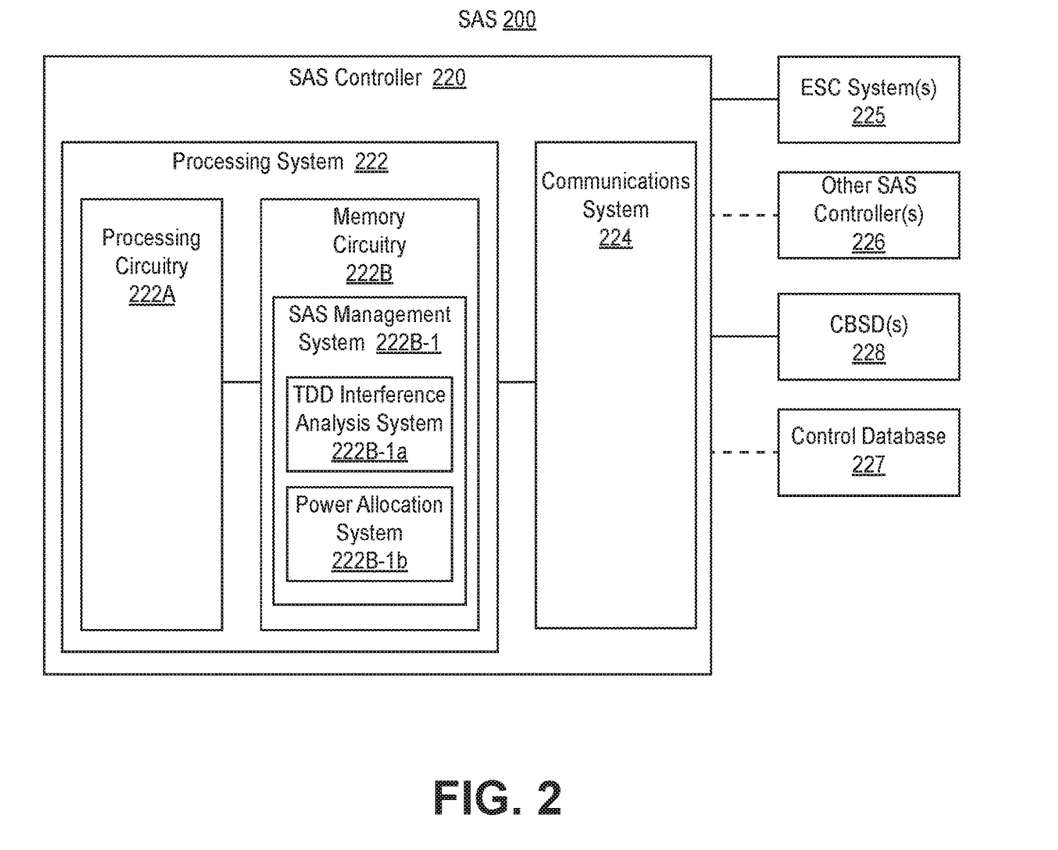
FIG. 2 illustrates one embodiment of a shared access system that is implemented according to embodiments of the invention.

FIG. 2 illustrates one embodiment of a SAS 200 that is implemented according to embodiments of the invention. The illustrated SAS 200 includes a SAS controller 220 coupled to one or more CBSDs (CBSD(s)) 228. The SAS controller 220 may also be referred to as SAS controller circuitry. Each CBSD is operated by a GAA user and/or a PAL.

In one embodiment, the SAS controller 220 is coupled to at least one environmental sensing capability system (ESC system(s)) 225. In another embodiment, the SAS controller 220 is coupled to a central database 227, e.g. which has information about when certain incumbent users (such as satellite ground stations) and/or PALs are transmitting. In a further embodiment, the SAS controller 220 is coupled to at least one other SAS controller (other SAS controller(s)) 226, e.g. controlling other CBSDs operating in the same or overlapping frequency spectrum. For example, such other CBSDs controlled by other SAS controller(s) 226 and their PALs, GAA users, and associated incumbent users may generate electromagnetic energy that overlaps the geographic region and frequency spectrum of the CBSDs 228 controlled by SAS 220, and thus must be accounted for by the SAS 220 when the SAS 220 performs interference analysis and authorizes operation of CBSD(s) 228 of the PAL(s) and/or the GAA user(s). Alternatively, the SAS 220 and its PALs and GAA users, may generate electromagnetic energy that overlaps the geographic region of the other SAS(s) 226, and thus must be accounted for by the other SAS controller(s) 226 when the other SAS(s) perform interference analysis, and authorize operation of CBSDs of PALs and GAA users (associated with the other SAS(s) 226). By coupling SASs that are geographically proximate to one another, each SAS can account for electromagnetic energy emitted from those proximate geographies.

The ESC system 225 detects, and communicates to the SAS controller 220, the presence of signal(s), e.g. from some incumbent user(s), such as RADARs. Alternatively, incumbent users can inform the SAS controller 225 that they are operating, e.g. by transmitting a signal beacon, or communicating with the central database 227 which may be coupled to the SAS controller 220. Upon notification of operation of an incumbent user, the SAS controller 220, at least in part, models the propagation of transmissions of the CBSD(s) 228 and regulates the operation (e.g. power levels and frequencies of operation) of the CBSD(s) 228 to allow the incumbent user(s) to operate free of interference. The SAS controller 220 otherwise controls the operation (e.g. power levels and frequencies of operation) of the GAA user(s)' CBSD(s) so that the PAL(s) system(s) operate free of interference.

In one embodiment, the SAS controller 220 includes a processing system 222 coupled to a communications system 224. The processing system 222 controls the operation of CBSD(s) 228 that form part of the SAS 200.

The communications system 224 facilitates communications between the communications system 224 (and thus the SAS controller 220—e.g. the processing system 222) and other systems or devices, e.g. CBSD(s) 228, the ESC system(s) 125, the central database 227, and/or other SAS(s) 226. In one embodiment, the communications system 224 includes a modem, e.g. an Internet data modem, a radio, and/or any other communications device(s) that can facilitate communications to the aforementioned devices.

Optionally, the processing system 222 may be a state machine, e.g. comprised of processing circuitry 222A coupled to memory circuitry 222B. Alternatively, the processing system 222 may be a neural network.

In the illustrated embodiment, the memory circuitry 222B includes a SAS management system 222B-1. In the illustrated embodiment, the SAS management system 222B-1 includes a TDD interference analysis system 222B-1*a* and a power allocation system 222B-1*b*. The TDD interference analysis system 222B-1a determines the contribution to the aggregate interference in frequency spectrum at a protection point by each TDD system in a corresponding neighborhood as further described herein. The power allocation system 222B-1*b* determines the maximum power level of certain CBSDs. Optionally, the power allocation is implemented with an IAP that operates substantially accordingly to requirement R2-SGN-16; however the power allocation system 222B-1*b* may be implemented in other ways to fairly allocate transmission power.

The SAS management system 222B-1 also includes techniques for generating neighborhoods around each protection point, and determining the aggregate level of interference in frequency spectrum at each protection point. To this end, the SAS management system 222B-1 may include propagation models (e.g. free space path loss model, irregular terrain model and/or Hata model (or variations thereof)) with which to determine path loss between CBSDs and protection point(s). The SAS management system 222B-1 may also include a database of information about CBSDs (e.g. geographic location, height, terrain morphology, and/or effective radiated power information); additionally and/or alternatively, the SAS management system 222B-1 may remotely obtain such information, e.g. from the central database 227 and/or from other SAS controller(s) 226.

Figure 3:
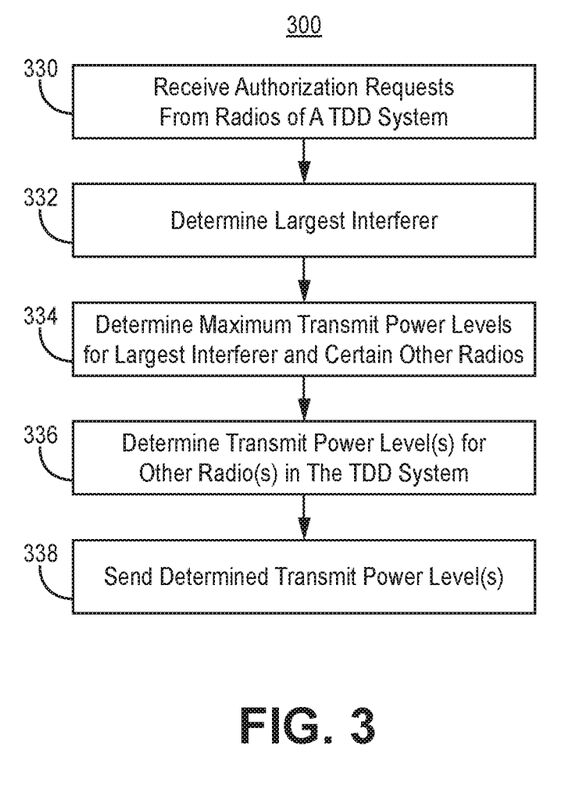
FIG. 3 illustrates one embodiment of a method of determining power levels of time division duplexing radios of a time division duplexing system of a SAS.

FIG. 3 illustrates one embodiment of a method of determining power levels of TDD radios of a TDD system of a SAS 300. More specifically, FIG. 3 illustrates a method of determining power levels of TDD radios for a single protection point. To the extent that the method 300 shown in FIG. 3 is described herein as being implemented in the system shown in FIG. 2, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

The aforementioned technique can be extended to multiple protection points where the recommended power for each protection point is determined independently. The final recommend power for a CBSD will be the minimum recommended power over all the protection points a CBSD has to protect. A region, zone, or area can be represented as multiple protection point. The aforementioned technique may have applicability to locations, e.g. points, other than protection points. Therefore, protection point shall be more generally referred to as point. Further, because the technique can be used in systems other than a SAS, the more general term 'radio' shall be used for CBSD.

Optionally, in block 330, receive, e.g. at a SAS controller, requests from TDD radios of a TDD system to transmit in frequency spectrum, and possibly other radios in the neighborhood; the TDD radios are part of a SAS and the frequency spectrum is controlled by the SAS controller. In block 332, determine the largest interferer among the radios of the TDD system. An exemplary technique will be subsequently described. The largest interferer is the radio that has generated the largest interference in frequency spectrum at a point. If only one TDD radio is in the neighborhood, then that TDD radio is deemed to be the largest interferer.

In block 334, determine maximum transmit power levels for the largest interferer of the TDD system, and certain other radios in a neighborhood of the point which are not other radios in the TDD system of which the largest interferer is part. Some of the certain other radios may have submitted a grant request to transmit in the frequency spectrum that is evaluated contemporaneously with the TDD radios grant request. Alternatively, some of the certain other radios may have submitted a grant request, which was approved, prior to the grant request of the TDD radios.

CBSDs are capable of issuing inquiries other than grant requests which may initiate power allocation determination. For example, CBSDs may inquire whether a channel is available for transmission. For pedagogical purposes, grant requests shall be exemplified herein. Such inquiries, including but not limited to grant requests, are referred to herein as 'requests'.

Optionally, use the power allocation system 222B-1*b* to perform block 334. It is to be emphasized here that WInn- Forum requirement R2-SGN-16 mandates that all TDD radios of a TDD system which have issued a grant request will be analyzed separately to determine power allocation amongst CBSDs, while in embodiments of the invention only the largest interferer—which has issued a grant request—of the TDD system is analyzed to determine power allocation amongst CBSDs.

In block 336, determine the transmit power level(s) for other TDD radio(s) (other than the largest interferer) of the TDD system of which the largest interferer is part. For example, determine the transmit power level(s) for some or all of, i.e. at least one of, the other TDD radio(s) (other than the largest interferer) of the TDD system of which the largest interferer is part. An exemplary technique for doing so will be subsequently described. Optionally, in block 338, send the determined transmit power levels to the corresponding radios, e.g. TDD radios, which are configured to then operate at the corresponding transmit power levels.

If a region having more than one point is analyzed, then blocks 332 through 336 are repeated for each point. A largest interferer in a neighborhood around each point, and maximum transmit power levels of each TDD radio of a TDD system are determined.

If more than one point is analyzed, e.g. for a PPA or GWPZ, the largest interferer may vary by point. In such a case, a maximum transmit power is determined for each TDD radio of a TDD system at each protection point. Thereafter, the smallest determined maximum transmit power for each TDD radio is selected from the set of determined maximum transmit powers for a TDD radio for each point. The smallest determined maximum transmit powers may be communicated to the corresponding TDD radios.

Figure 4:
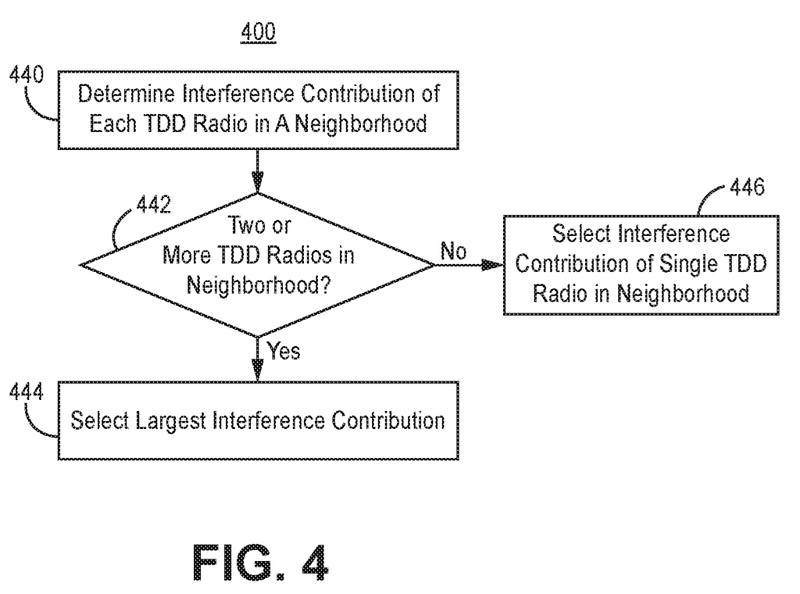
FIG. 4 illustrates one embodiment of a method of determining a contribution of a time division duplexing radio to aggregate interference.

FIG. 4 illustrates one embodiment of a method of determining a contribution of a TDD radio to aggregate interference 400. FIG. 4 illustrates one embodiment of how to implement block 332. The method of FIG. 4 is performed for each TDD system having a radio in the neighborhood.

To the extent the method 400 shown in FIG. 4 is described herein as being implemented in the system shown in FIG. 2, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 440, determine an interference contribution in frequency spectrum at a point based on an intended power level of the TDD radios or a requested power level of the TDD radios. The interference contribution is determined for each TDD radio, of a TDD system, in a neighborhood around a point. In block 442, determine if the TDD system has two or more TDD radios (transmitting in the frequency spectrum) in the neighborhood. In block 444, if the TDD system has two or more TDD radios (transmitting in the frequency spectrum) in the neighborhood, select a largest interference contribution (e.g. power level) in the frequency spectrum at the point, where the largest interference contribution corresponds to a TDD radio. Use the selected largest interference contribution as the interference contribution of the TDD system in the frequency spectrum and at the point. In block 446, if the TDD system has one TDD radio (transmitting in the frequency spectrum) in the neighborhood, then select the interference contribution of the one TDD radio, in the neighborhood and of the TDD system, as the interference contribution of the TDD system in the frequency spectrum and at the point. Use the selected interference contribution as the interference contribution of the TDD system in the frequency spectrum at the point.

Figure 5:
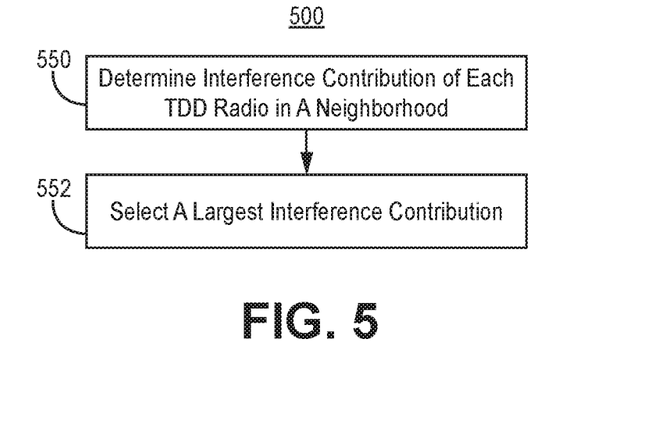
FIG. 5 illustrates another embodiment of a method of determining a contribution of a time division duplexing radio to aggregate interference.

FIG. 5 illustrates another embodiment of a method of determining a contribution of a TDD radio to aggregate interference 500. FIG. 5 illustrates another embodiment of how to implement block 332. The method of FIG. 5 is performed for each TDD system having a radio in the neighborhood.

To the extent the method 500 shown in FIG. 5 is described herein as being implemented in the system shown in FIG. 2, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 550, determine an interference contribution in frequency spectrum at the point. The interference contribution is determined for each TDD radio, of a TDD system, in a neighborhood around a point. In block 552, select a largest interference contribution (e.g. power level) in the frequency spectrum at the point, where the largest interference contribution corresponds to a TDD radio, of the TDD system, in the neighborhood. Use the selected largest interference contribution as the interference contribution of the TDD system in the frequency spectrum and at the point. Optionally, if the TDD radios not only request authorization to transmit in frequency spectrum but also request authorization to transmit at a specific power level, the requested transmit power level of each radio is used to determine the interference contribution at the point for each TDD radio, e.g. for the methods illustrated above with respect to FIGS. 4 and 5.

Figure 6:
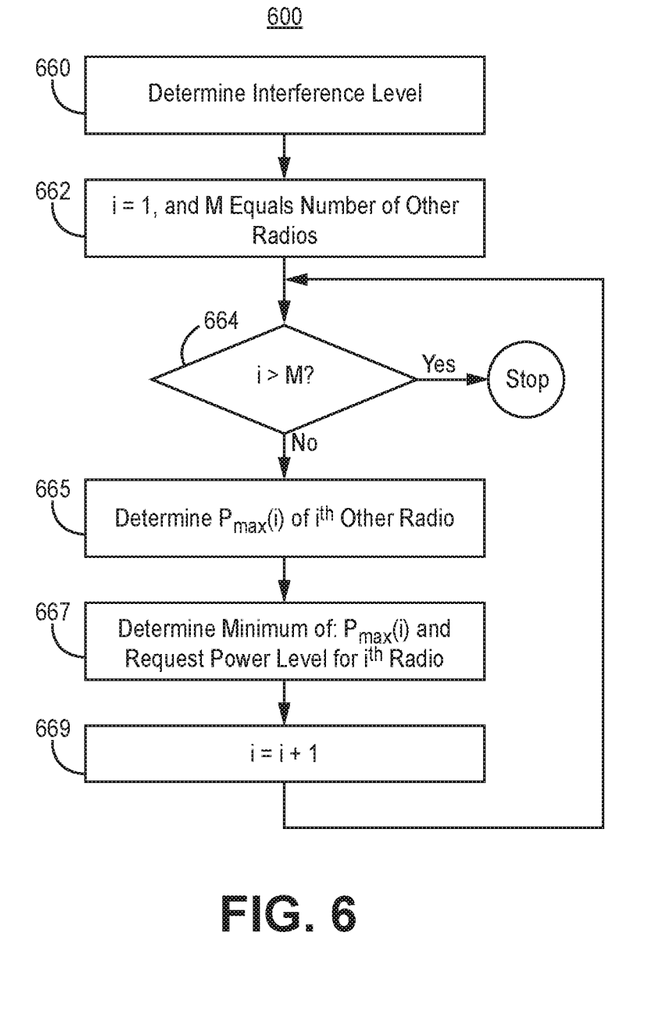
FIG. 6 illustrates an embodiment of a method of determining a maximum transmission power of at least one other time division duplexing radio.

FIG. 6 illustrates an embodiment of a method of determining a maximum transmission power of at least one other TDD radio 600. The other TDD radios are TDD radios in the TDD system, excluding the TDD radio that is the largest interferer. FIG. 6 illustrates an embodiment of how to implement block 336.

To the extent the method 600 shown in FIG. 6 is described herein as being implemented in the system shown in FIG. 2, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 660, determine an interference level at the point due to the largest interferer assuming use of the maximum transmit power (MTP) determined in block 334. In one embodiment, the interference level (IL) is calculated as follows:

$$IL = MTP - PL_{LI} + RxAG + TxAG_{LI} \qquad \text{(Equation 1), where}$$

$PL_{LI}$ is a path loss between the largest interferer and the protection point, RxAG is antenna gain, e.g. isotropic antenna gain, of a receiver at the protection point, and $TxAG_{LI}$ is antenna gain, e.g. isotropic antenna gain, of a transmitter of the largest interferer.

Path loss may be determined using one of numerous techniques such as the irregular terrain model, enhanced Hata model, or free space path loss (FSPL) model. FSPL is calculated as follows:

$$FSPL(decibels) = 20 * \log_{10}(d) + 20 * \log_{10}(f) - 27.55 \quad \text{(Equation 2), where}$$

d is the distance in meters between the largest interferer and protection point, and f is frequency (e.g. average frequency of the frequency spectrum transmitted by the largest interferer) in megahertz.

In block 662, set index i to one, and where M equals the number of other TDD radios (excluding the largest interferer) in the TDD system. Thus M+1 equals the number of TDD radios in the TDD system. In block 664, determine if i is greater than M. If i is greater than M, then stop. If i is not greater than M, then continue to block 665.

In block 665, determine a maximum transmit power level of the $i^{th}$ other TDD radio. In one embodiment, determine the power level of the $i^{th}$ other TDD radio by calculating the maximum power level of the $i^{th}$ other TDD radio (Pmax(i)). Pmax(i) is calculated as follows:

$$Pmax(i) = IL + PL(i) - RxAG - TxAG(i) \quad \text{(Equation 3), where}$$

PL(i) is a path loss between the $i^{th}$ other TDD radio and the protection point, and TxAG(i) is antenna gain, e.g. isotropic antenna gain, toward the protection point of a transmitter of the $i^{th}$ other TDD radio.

Path loss, PL(i), may be determined using any of the techniques described above. For example, for FSPL, d is the distance in meters between the $i^{th}$ other TDD radio and the protection point.

Optionally, in block 667, determine the minimum of Pmax(i) and the transmit power level requested (if requested), e.g. from the SAS controller, by the $i^{th}$ other TDD radio. Alternatively, if a power level is requested by a radio and if this optional block is not performed, the $i^{th}$ radio may be granted a transmit power level that is higher than the requested power level for the $i^{th}$ other TDD radio.

In block 669, i equals i plus one. Then, proceed to block 664. Note, block 662, 664, 665, 667, and 669 illustrate how to determine a maximum transmit power level of each of the other TDD radios (which excludes the largest interferer) based upon the determined interference level.

EXEMPLARY EMBODIMENTS

Example 1 includes a method for determining transmit power levels of a time division duplexing (TDD) system in a shared frequency spectrum, comprising: determining an interference contribution in frequency spectrum at the point, where the interference contribution is determined for each TDD radio, of the TDD system, in a neighborhood around a point; selecting a TDD radio in the neighborhood having a largest interference contribution in the frequency spectrum at the point; determining transmit power levels for (a) the selected TDD radio and (b) other radios in the neighborhood that are not part of the TDD system; determining transmit power level for at least one TDD radio in the TDD system that is not the TDD radio having the largest interference contribution in the frequency spectrum; and sending the determined transmit power levels to corresponding radios which are configured to operate at the corresponding transmit power levels.

Example 2 includes the method of Example 1, wherein determining the transmit power level for the at least one radio in the TDD system that is not the TDD radio having the largest interference contribution in the frequency spectrum comprises: determining an interference level at the point due to the largest interferer assuming use of the determined transmit power; and determining a maximum transmit power level of each of the other TDD radios based upon the determined interference level.

Example 3 includes the method of any of Examples 1-2, further comprising: receiving a request for a transmit power level from another TDD radio of the TDD system; determining a minimum of the requested transmit power level requested by the other radio and the determined maximum transmit power level of the other TDD radio; and wherein sending the determined transmit power level to the other TDD radio, which is configured to operate at the sent transmit power level, comprises sending the determined minimum.

Example 4 includes the method of any of Examples 1-3, wherein if the determined transmit power level of another TDD radio is higher than a transmit power level requested by the other TDD radio, then sending the determined transmit power level to the other TDD radio.

Example 5 includes the method of any of Examples 1-4, wherein determining the interference contribution comprises determining the interference contribution using path loss, between the largest interferer and the protection point, which is determined using one of: an irregular terrain model, enhanced Hata model, and a free space path loss model.

Example 6 includes the method of any of Examples 1-5, wherein determining the transmit power level for at least one TDD radio in the TDD system that is not the TDD radio having the largest interference contribution in the frequency spectrum comprises determining the transmit power for each TDD radio in the TDD system that is not the TDD radio having the largest interference contribution in the frequency spectrum.

Example 7 includes the method of any of Examples 1-6, wherein the neighborhood has a circular area.

Example 8 includes a program product comprising a non-transitory processor-readable medium on which program instructions, configured to be executed by a programmable processor, are embodied, wherein the program instructions are operable to: determine an interference contribution in frequency spectrum at the point, where the interference contribution is determined for each TDD radio, of the TDD system, in a neighborhood around a point; select a TDD radio in the neighborhood having a largest interference contribution in the frequency spectrum at the point; determine transmit power levels for (a) the selected TDD radio and (b) other radios in the neighborhood that are not part of the TDD system; determine transmit power level for at least one TDD radio in the TDD system that is not the TDD radio having the largest interference contribution in the frequency spectrum; and send the determined transmit power levels to corresponding radios which are configured to operate at the corresponding transmit power levels.

Example 9 includes the program product of Example 8, wherein determine the transmit power level for the at least one radio in the TDD system that is not the TDD radio having the largest interference contribution in the frequency spectrum comprises: determine an interference level at the point due to the largest interferer assuming use of the determined transmit power; and determine a maximum transmit power level of each of the other TDD radios based upon the determined interference level.

Example 10 includes the program product of any of Examples 8-9, wherein the program instructions are further operable to: receive a request for a transmit power level from another TDD radio of the TDD system; determine a minimum of the requested transmit power level requested by the other radio and the determined maximum transmit power level of the other TDD radio; and wherein send the determined transmit power level to the other TDD radio, which is configured to operate at the sent transmit power level, comprises send the determined minimum.

Example 11 includes the program product of any of Examples 8-10, wherein if the determined transmit power level of another TDD radio is higher than a transmit power level requested by the other TDD radio, then sending the determined transmit power level to the other TDD radio.

Example 12 includes the program product of any of Examples 8-11, wherein determine the interference contribution comprises determining the interference contribution using path loss, between the largest interferer and the protection point, which is determined using one of: an irregular terrain model, enhanced Hata model, and a free space path loss model.

Example 12 includes the program product of any of Examples 8-11, wherein determine the transmit power level for at least one TDD radio in the TDD system that is not the TDD radio having the largest interference contribution in the frequency spectrum comprises determine the transmit power for each TDD radio in the TDD system that is not the TDD radio having the largest interference contribution in the frequency spectrum.

Example 14 includes the program product of any of Examples 8-13, wherein the neighborhood has a circular area.

Example 15 includes a system, comprising: shared access system (SAS) controller circuitry; wherein the SAS controller circuitry is configured to: determine an interference contribution in frequency spectrum at the point, where the interference contribution is determined for each TDD radio, of the TDD system, in a neighborhood around a point; select a TDD radio in the neighborhood having a largest interference contribution in the frequency spectrum at the point; determine transmit power levels for (a) the selected TDD radio and (b) other radios in the neighborhood that are not part of the TDD system; determine transmit power level for at least one TDD radio in the TDD system that is not the TDD radio having the largest interference contribution in the frequency spectrum; and send the determined transmit power levels to corresponding radios which are configured to operate at the corresponding transmit power levels.

Example 16 includes the system of Example 15, wherein determine the transmit power level for the at least one radio in the TDD system that is not the TDD radio having the largest interference contribution in the frequency spectrum comprises: determine an interference level at the point due to the largest interferer assuming use of the determined transmit power; and determine a maximum transmit power level of each of the other TDD radios based upon the determined interference level.

Example 17 includes the system of any of Examples 15-16, wherein the SAS controller circuitry is further configured to: receive a request for a transmit power level from another TDD radio of the TDD system; determine a minimum of the requested transmit power level requested by the other radio and the determined maximum transmit power level of the other TDD radio; and wherein send the determined transmit power level to the other TDD radio, which is configured to operate at the sent transmit power level, comprises send the determined minimum.

Example 18 includes the system of any of Examples 15-17, wherein if the determined transmit power level of another TDD radio is higher than a transmit power level requested by the other TDD radio, then sending the determined transmit power level to the other TDD radio.

Example 19 includes the system of any of Examples 15-18, wherein determine the interference contribution comprises determine the interference contribution using path loss, between the largest interferer and the protection point, which is determined using one of: an irregular terrain model, enhanced Hata model, and a free space path loss model.

Example 20 includes the system of any of Examples 15-19, wherein determine the transmit power level for at least one TDD radio in the TDD system that is not the TDD radio having the largest interference contribution in the frequency spectrum comprises determine the transmit power for each TDD radio in the TDD system that is not the TDD radio having the largest interference contribution in the frequency spectrum.

Example 21 includes the system of any of Examples 15-20, wherein the neighborhood has a circular area.

Example 22 includes the system of any of Examples 15-21, wherein the SAS controller circuitry comprises processing circuitry coupled to communications circuitry.

Example 23 includes the system of any of Examples 15-22, wherein the SAS controller circuitry is coupled to at least one of: an environmental sensing capability system, at least one other SAS controller, the TDD system and other radios, and a central database.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

A processing system used in the present system and method can be implemented using software, firmware, hardware, or any appropriate combination thereof, as known to one of skill in the art. By way of example and not limitation, the processing circuitry 222A can include one or more of each of microprocessor circuitry, microcontroller circuitry, Digital Signal Processors (DSP) circuitry, Application Specific Integrated Circuits (ASICs), programmable logic device circuitry, and/or Field Programmable Gate Array (FPGA) circuitry. The processing system can also include functions with software programs, firmware, or other computer readable instructions for carrying out various process tasks, calculations, and control functions used in the present method and system.

The present method can be implemented by computer executable instructions, such as program modules or components, which are executed by at least one processor. Generally, program modules include routines, programs, objects, data components, data structures, algorithms, and the like, which perform particular tasks or implement particular data types.

Instructions for carrying out the various process tasks, calculations, and generation of other data used in the operation of the methods described herein can be implemented in software, firmware, or other computer-readable or processor-readable instructions. These instructions are typically stored on any appropriate computer program product that includes a computer readable medium used for storage of computer readable instructions or data structures.

Suitable computer readable media may include storage or memory media such as the memory circuitry 222B illustrated herein. For example, the memory circuitry 222B may include magnetic media (such as conventional hard disks), optical media (such as CDs, DVDs, and Blu-ray discs, and semiconductor memory (such as Random Access Memory (RAM) (including, but not limited to, Dynamic Random Access Memory (DRAM), Synchronous Dynamic Random Access Memory (SDRAM), Double Data Rate (DDR) RAM, RAMBUS Dynamic RAM (RDRAM), and Static RAM (SRAM)), Read Only Memory (ROM), Electrically Erasable Programmable ROM (EEPROM), and Flash memory.

The invention claimed is:

1. A method, comprising:
   determining an interference contribution in a frequency spectrum at a point, where the interference contribution is determined for each time division duplexing (TDD) radio, of a TDD system, in a neighborhood around the point;
   selecting a TDD radio, of the TDD system, in the neighborhood having a largest interference contribution at the point and in the frequency spectrum;
   determining a transmit power level for the selected TDD radio;
   using the determined transmit power level of the selected TDD radio, determining a second interference contribution, of the selected TDD radio, at the point and in the frequency spectrum;
   using the second interference contribution, determining a transmit power level for each of at least one TDD radio of the TDD system that is not the selected TDD radio; and
   sending each determined transmit power level, for each of the at least one TDD radio, to a corresponding TDD radio which is configured to transmit, in the frequency spectrum that is shared spectrum, at a corresponding transmit power level.

2. The method of claim 1, further comprising:
   receiving a request for a transmit power level from one of TDD radios, of the TDD system, that excludes the TDD radio having the largest interference contribution in the frequency spectrum at the point; and
   determining a minimum of (a) the requested transmit power level requested by the one of the TDD radios and (b) a determined transmit power level of the one of the TDD radios that was determined using the second interference contribution;
   wherein sending the determined transmit power level, that was determined using the second interference contribution, to the corresponding TDD radio comprises sending the minimum of (a) the requested transmit power level and (b) the determined transmit power level that was determined using the second interference contribution.

3. The method of claim 1, wherein if a determined transmit power level, of another TDD radio of the TDD system, whose determined transmit power was determined using the second interference contribution, is higher than a transmit power level requested by the other TDD radio, then sending the determined transmit power level, determined using the second interference contribution, to the other TDD radio.

4. The method of claim 1, wherein determining the interference contribution comprises determining the interference contribution using path loss, between the selected TDD radio and the point, which is determined using one of: an irregular terrain model, an enhanced Hata model, and a free space path loss model.

5. The method of claim 1, wherein the neighborhood has a circular area.

6. A program product comprising a non-transitory processor-readable medium on which program instructions, configured to be executed by a programmable processor, are embodied, wherein the program instructions are operable to:
   determine an interference contribution in a frequency spectrum at a point, where the interference contribution is determined for each time division duplexing (TDD) radio, of a TDD system, in a neighborhood around the point;
   select a TDD radio, of the TDD system, in the neighborhood having a largest interference contribution at the point and in the frequency spectrum;
   determine a transmit power level for the selected TDD radio;
   using the determined transmit power level of the selected TDD radio, determine a second interference contribution, of the selected TDD radio, at the point and in the frequency spectrum;
   using the second interference contribution, determine a transmit power level for each of at least one TDD radio of the TDD system that is not the selected TDD radio; and
   send each determined transmit power level, for each of the at least one TDD radio, which is configured to transmit, in the frequency spectrum that is shared spectrum, at a corresponding transmit power level.

7. The program product of claim 6, wherein the program instructions are further operable to:
   receive a request for a transmit power level from one of TDD radios, of the TDD system, that excludes the TDD radio having the largest interference contribution in the frequency spectrum at the point; and
   determine a minimum of (a) the requested transmit power level requested by the one of the TDD radios and (b) a determined transmit power level of the one of the TDD radios that was determined using the second interference contribution;
   wherein send the determined transmit power level, that was determined using the second interference contribution, to the corresponding TDD radio comprises send the minimum of (a) the requested transmit power level and (b) the determined transmit power level that was determined using the second interference contribution.

8. The program product of claim 6, wherein if a determined transmit power level, of another TDD radio of the TDD system, whose determined transmit power was determined using the second interference contribution, is higher than a transmit power level requested by the other TDD radio, then sending the determined transmit power level, determined using the second interference contribution, to the other TDD radio.

9. The program product of claim 6, wherein determine the interference contribution comprises determine the interference contribution using path loss, between the selected TDD radio and the point, which is determined using one of: an irregular terrain model, enhanced Hata model, and a free space path loss model.

10. The program product of claim 6, wherein the neighborhood has a circular area.

11. A system, comprising:
shared access system (SAS) controller circuitry;
wherein the SAS controller circuitry is configured to:
   determine an interference contribution in a frequency spectrum at a point, where the interference contribution is determined for each TDD radio, of a time division duplexing (TDD) system, in a neighborhood around the point;
   select a TDD radio, of the TDD system, in the neighborhood having a largest interference contribution at the point and in the frequency spectrum;
   determine a transmit power level for the selected TDD radio;
   using the determined transmit power level of the selected TDD radio, determine a second interference contribution, of the selected TDD radio, at the point and in the frequency spectrum;
   using the second interference contribution at the point from the selected TDD radio, determine a transmit power level for each of at least one TDD radio of the TDD system that is not the selected TDD radio; and
   send each determined transmit power level, for each of the at least one TDD radio, to a corresponding TDD radio which is configured to transmit, in the frequency spectrum that is shared spectrum, at a corresponding transmit power level.

12. The system of claim 11, wherein the SAS controller circuitry is further configured to:
   receive a request for a transmit power level from one of TDD radios, of the TDD system, that excludes the TDD radio having the largest interference contribution in the frequency spectrum at the point; and
   determine a minimum of (a) the requested transmit power level requested by the one of the TDD radios and (b) a determined transmit power level of the one of the TDD radios that was determined using the second interference contribution;
   wherein send the determined transmit power level, that was determined using the second interference contribution, to the corresponding TDD radio comprises send the minimum of (a) the requested transmit power level and (b) the determined transmit power level that was determined using the second interference contribution.

13. The system of claim 11, wherein if a determined transmit power level, of another TDD radio of the TDD system, whose determined transmit power was determined using the second interference contribution, is higher than a transmit power level requested by the other TDD radio, then sending the determined transmit power level, determined using the second interference contribution, to the other TDD radio.

14. The system of claim 11, wherein determine, using the interference contribution at the point from the TDD radio having the largest interference contribution in the frequency spectrum at the point, the interference contribution comprises determine the interference contribution using path loss, between the selected TDD radio and the point, which is determined using one of: an irregular terrain model, enhanced Hata model, and a free space path loss model.

15. The system of claim 11, wherein the neighborhood has a circular area.

16. The system of claim 11, wherein the SAS controller circuitry comprises processing circuitry coupled to communications circuitry.

17. The system of claim 11, wherein the SAS controller circuitry is coupled to at least one of: an environmental sensing capability system, at least one other SAS controller, TDD radios of the TDD system, other radios, and a central database.

* * * * *